Dec. 11, 1928. Re. 17,164

R. J. MILLER

WALL LOUVER VENTILATOR

Original Filed June 8, 1925

INVENTOR
ROBERT J. MILLER
BY
ATTORNEYS.

Reissued Dec. 11, 1928. Re. 17,164

UNITED STATES PATENT OFFICE

ROBERT J. MILLER, OF OAKLAND, CALIFORNIA.

WALL LOUVER VENTILATOR.

Original No. 1,613,047, dated January 4, 1927, Serial No. 35,566, filed June 8, 1925. Application for reissue filed March 30, 1927. Serial No. 179,682.

My invention is a wall-louver ventilator installation adapted to be inserted as a unit in a wall with the louvers at the outside.

My whole device is made of sheet metal except for a wire screen and forms a device readily installed, particularly for the ventilation of cold closets, bath-rooms, or the like.

The louvers are set in a frame which reaches from the outside to the inside of a wall and has secured to the front edge thereof an all around flange adapted to lie against the surface of the stucco applied to a support in building structures known as stucco walls, and has a second flange secured to its wall rearwardly of the front flange and in spaced relation thereto, the second flange being adapted to be embedded in the inner face of the stucco wall so as to allow the stucco to be anchored between the two flanges.

The louvers are further provided with grooves or channels near the rear edge thereof, the said channels being adapted to receive the ends of laths nailed to supporting studdings for more firmly anchoring the louver.

I further propose to provide certain improvements in the structural features of a louver whereby the construction is simplified and a neater looking product is obtained. In this connection I propose to use a one-piece louver front that may be soldered to the louver box so as to make the entire louver appear as a single unit.

I further propose to provide a simplified method for applying a screen to the louver in such a manner that the same may be easily exchanged for a new one.

I further propose to provide an interior finishing piece that may be fitted into the louver from the inside.

My invention will be more readily understood from the following description and drawings, in which:

Figure 1 is a vertical section through my wall louver;

Figure 11:
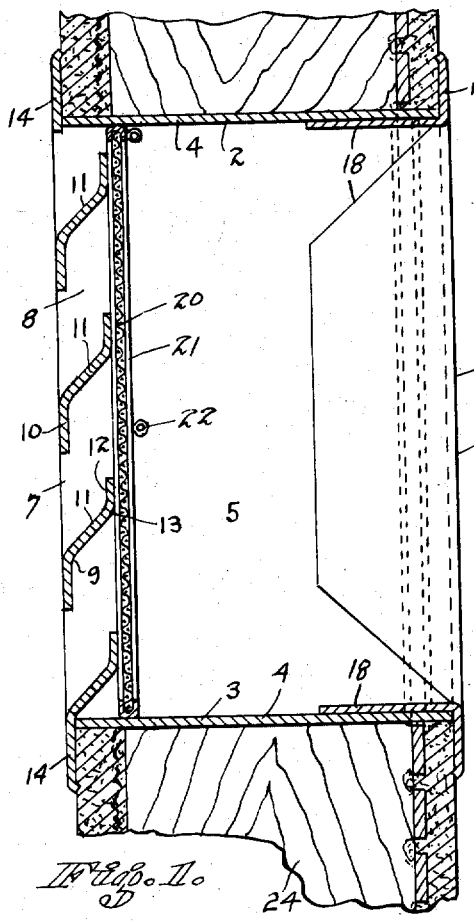
Figure 3:
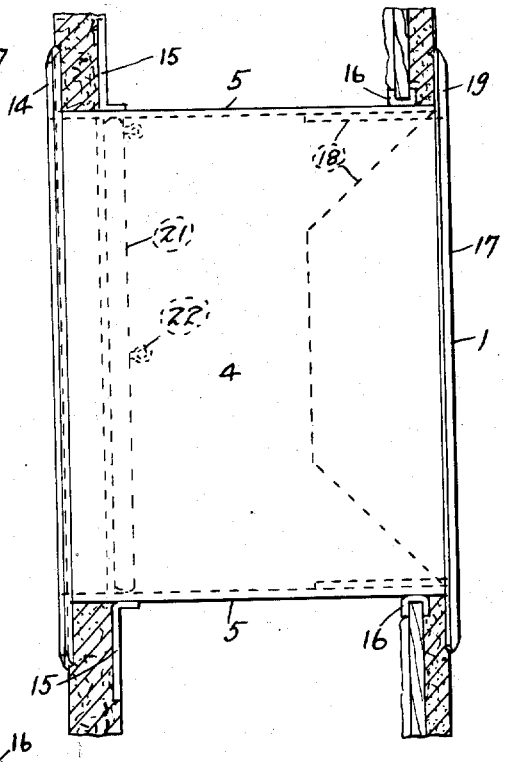
Figure 3 is a perspective view of my louver.
Figure 2:
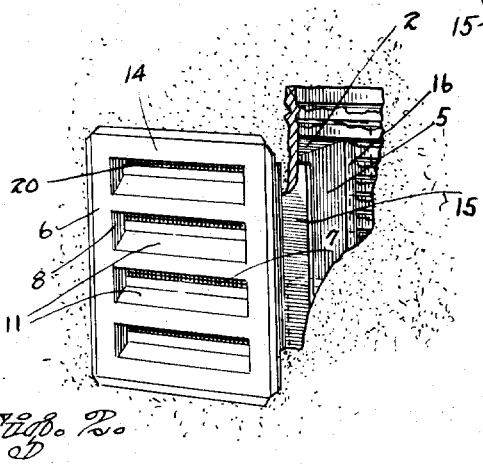
Figure 2 is a top plan view showing the relation of the parts thereof to a wall structure.

Referring to the drawings, the numeral 1 designates the louver as a whole having a wall section 2 formed of a rectangular metal frame 3, having top and bottom walls 4 and end walls 5. A series of louvers are formed by making a series of transverse slits 7, crossing the front sheet 6 of metal, and a series of spaced end slits 8, as shown in Figure 2. The metal is then bent backwardly forming an obtuse angle bend 9 from the front web 10 to the sloping portion 11 of the louver, this latter being connected to the rear section 12 of the slit portion of the front sheet, preferably by an obtuse angle 13. These bent back portions 11 and 12 are soldered to the inside of end walls 5, forming a strong and tight louver. The front sheet 6 forms an escutcheon 14 extending on the outside of the wall.

The front portion of the wall louver is provided with angles 15 and rearwardly placed channels 16 of sheet metal soldered or riveted to the walls. These are usually on the end walls only and provide flanges for engaging the stucco or other outside finish of the house and the lath or plaster board.

The angles 15 are adapted to be embedded in the inner face of the stucco wall and the distance between the angles and the front escutcheon is such that the latter is presented flush with a layer of stucco applied to the support in the usual manner so that the stucco is firmly anchored between the escutcheon and the angle.

The channels 16 are arranged to lie alongside of the inner plane of the studdings 24 of the wall along the inner faces thereof and are adapted to receive the ends of laths usually applied to the studdings for supporting a coat of plaster, or the like.

The inner frame is formed by a piece of sheet metal which has inwardly bent flanges 18 and an escutcheon portion 19. The flanges form a snug fit on the top and bottom 4 and the side walls 5 of the wall section of the louver, and may be permanently secured in position after the interior of the house is finished.

A screen 20, built on a frame 21, is inserted in the wall section directly behind the louvers and is preferably retained in place by friction and is removable by a ring 22.

My invention can be materially changed in detail to suit special requirements without departing from the spirit thereof.

Having described my invention, what I claim is:—

1. In combination, a box adapted for insertion in a wall and a louver front soldered to the front end thereof to project beyond the same so as to present an all-around flange, the louver front having parallel horizontal sections bent backward to contact the walls of the box and having the ends of said sections soldered to the said walls.

2. A louver box adapted for insertion between the studdings of a wall and dimensioned to project beyond the studdings and channels fixed to the outside of the box adjacent the inner plane of the studdings for receiving the ends of laths nailed to the studdings.

3. A ventilator comprising a rectangular frame adapted to extend through the wall of a building, outwardly extending flanges on said frame adapted to engage the outer surface of the wall, a plurality of louvers extending across the frame, a screen removably positioned adjacent the louvers, a removable inner frame engaging the inner surfaces of said first mentioned frame, flanges on said inner frame to engage the inner surface of the wall, and inner and outer members secured to the outer surface of the first mentioned frame and adapted to be embedded in the wall.

4. In combination, a louver box adapted for insertion in a stucco wall having a flange extending from the front edge thereof to lie against the outside of the stucco and a second positioning flange in spaced relation to the first flange adapted to be embedded in the inner face of the stucco wall so as to allow the latter to be anchored between the two flanges.

ROBERT J. MILLER.